United States Patent [19]

Murén

[11] Patent Number: 4,575,888
[45] Date of Patent: Mar. 18, 1986

[54] THREAD CUTTING INSERT

[75] Inventor: Sture Murén, Gävle, Sweden

[73] Assignee: Santrade Ltd., Lucerne, Switzerland

[21] Appl. No.: 580,015

[22] Filed: Feb. 14, 1984

[30] Foreign Application Priority Data

Mar. 15, 1983 [SE] Sweden .................................. 8301396

[51] Int. Cl.⁴ .............................................. B26B 9/02
[52] U.S. Cl. ..................................... 10/101 R; 30/357
[58] Field of Search ...................... 30/357, 103; 10/87,
  10/110, 111, 113, 128, 140, 141, 101 R; 76/101
  B; 408/144

[56] References Cited

U.S. PATENT DOCUMENTS

| | | | |
|---|---|---|---|
| 2,535,398 | 12/1950 | Economous | 10/4 X |
| 3,812,547 | 5/1974 | Reich | 10/101 |
| 3,852,859 | 12/1974 | Carpenter | 10/101 X |
| 4,233,867 | 11/1980 | Zimmerman | 467/113 X |
| 4,281,430 | 8/1981 | Hellnick | 10/101 R |

FOREIGN PATENT DOCUMENTS

| | | | |
|---|---|---|---|
| 975288 | 12/1976 | United Kingdom. | |
| 654784 | 2/1979 | U.S.S.R. | 10/111 |
| 865573 | 9/1981 | U.S.S.R. | 10/110 |

Primary Examiner—E. R. Kazenske
Assistant Examiner—Willmon Fridie, Jr.
Attorney, Agent, or Firm—Burns, Doane, Swecker & Mathis

[57] ABSTRACT

The present invention relates to a thread cutting insert (10) for use with an indexable tool. The insert (10) is a triangular, flat wafer of cutting material comprising three countersunk cutting corners (11), each having a chamfered part (12) provided with a cutting tip (13). The upper side of the cutting tip (13) is provided with a recess (22) which gives the insert (10) a positive cutting geometry. A flat upstanding area (23) is arranged radially inside the cutting tip (13) to finally shape the chip after it has been preformed at the recess (22).

12 Claims, 6 Drawing Figures

THREAD CUTTING INSERT

BACKGROUND AND OBJECTS OF THE INVENTION

The present invention relates to a thread cutting insert for use with an indexable tool comprising a flat wafer of cutting material of substantially triangular form, having a pair of opposed faces and a plurality of upstanding side walls extending therebetween. The juncture between the side walls defines a cutting corner that is placed substantially under an upper face. The cutting corner is provided with at least one cutting tip which upper surface defines a cutting surface. The cutting surface is provided with a positive first chipforming surface extending from a radiused nose part of the cutting tip to at least a half of a maximum feeding depth in a direction towards a second chipforming surface. The second chipforming surface is placed in the transition between the cutting surface and the upper face so that the first and the second chipforming surfaces cooperate to form and guide chips.

The chip obtained at chasing of threads with radial feeding is substantially V-shaped which form is very stiff and is therefore difficult to shape in a controlled way. A non-triangular thread cutting insert having a recessed cutting tip is previously known, but the chip obtained when machining a surface with such an insert will have a large radius of curvature which means chip entanglement and therefore risks for the operator, the work piece and the insert. A known thread cutting insert having a cutting corner placed under the upper face is provided with a chipforming area that, however, gives a chip with a large radius of curvature leading to the above-mentioned disadvantages. The form of the cutting tip of this insert gives a negative cutting course so that the insert will be subjected to large cutting forces.

The objects of the present invention is to provide a thread cutting insert with a shaping that solves the above-mentioned problems. The shape of the insert will give small cutting forces and a controlled chip removal at chasing of threads which means that the insert can be used for work pieces within a broad spectrum of materials and at varying machining data. These and other objects and advantages will become apparent with reference to the following detailed description in conjunction with the drawings in which:

DETAILED DESCRIPTION OF THE INVENTION

Figure 1:
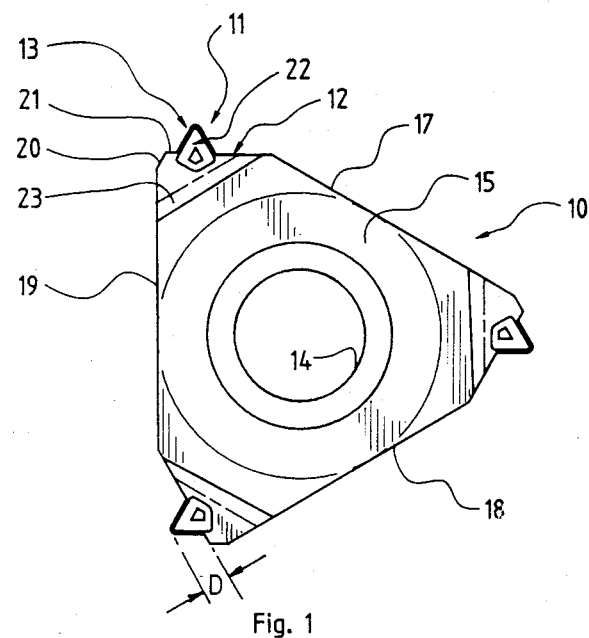
FIG. 1 is a top view of a new and improved thread cutting insert of the subject invention.
Figure 2:
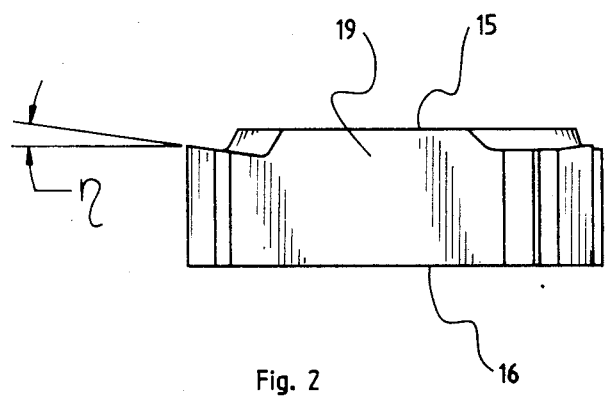
FIG. 2 is a side elevational view of a thread cutting insert of the subject invention.

Referring to FIGS. 1 and 2, the thread cutting insert 10 is typically formed from a wafer of hard, abrasion resistant material, such as a cemented carbide, and is substantially triangular in plan. The insert 10 is provided with three identical cutting corners 11 each having a chamfered part 12 with a cutting tip 13. The insert 10 may be provided with a central aperture 14 for mounting the insert on a tool holder. The insert 10 is arranged with a pair of opposed faces 15, 16 and three upstanding side walls 17, 18, 19 extending essentially perpendicularly therebetween. The upstanding side walls 17, 18, 19 form an angle of about 60° relative to each other. The chamfered part 12 is substantially perpendicular to the bisector of the connected cutting tip 13. The cutting tip 13 is arranged at the part of the chamfered part 12 that is longest from the aperture 14, i.e. near the side wall 19 at the upper corner at the left in FIG. 1. A chamfer 20 and a top cutting edge 21 are formed between the side wall 19 and the cutting tip 13. A recess 22 is countersunk in the upper surface of the cutting tip 13 and it extends along the upper surface of the cutting corner 11 towards a substantially flat, upstanding area 23. The area 23 is arranged as a connection between the upper surface of the cutting corner 11 and the upper face 15 in order to form and control the chip. The cutting corner 11 is sloping downwards and inwards, towards the area 23 forming an angle $\eta$ relative to the upper face 15, and therefore the insert 10 will obtain an angle of inclination of 0° in spite of the negative basic form of the insert and the mounting in a negative insert site. The angle $\eta$ is between 6° to 20°. Due to the cutting corner 11 having a recess 22 the insert 10 as a whole will have a positive cutting course.

Figure 3:
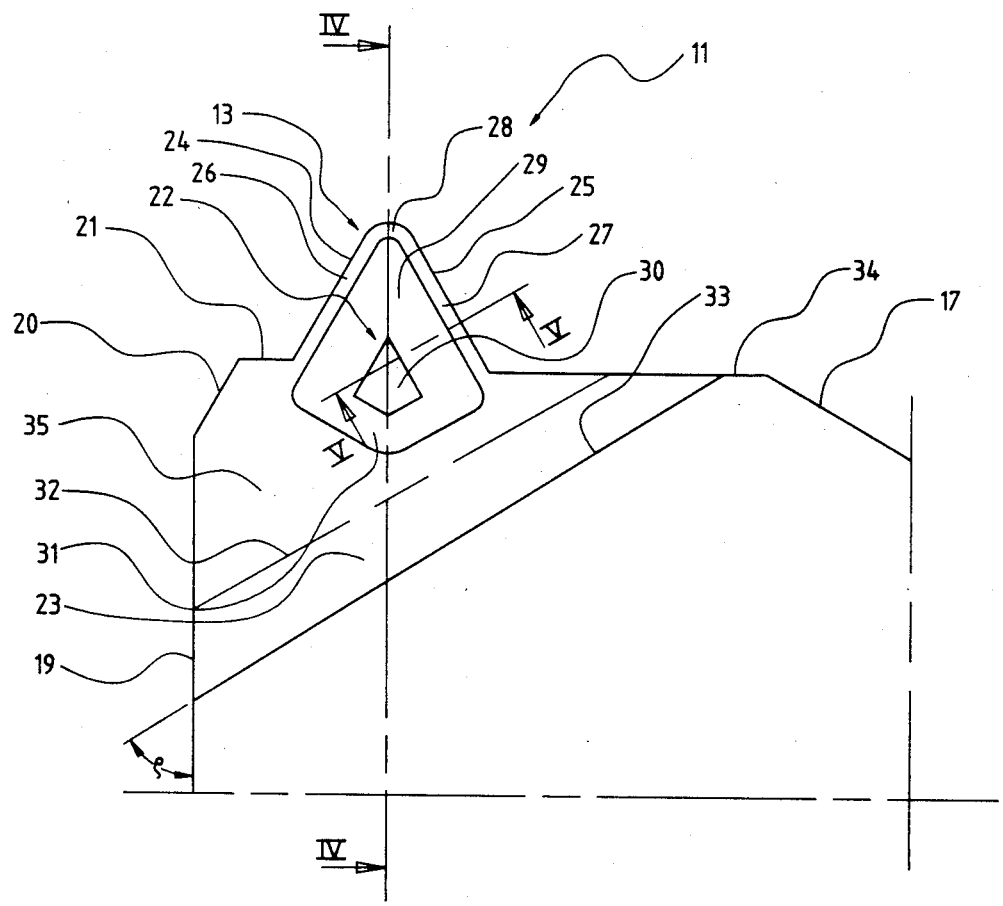
FIG. 3 is a top view of an enlarged cutting corner of the thread cutting insert of the subject invention.

In FIG. 3 is shown a cutting corner 11 having a cutting tip 13 arranged symmetrically to a line IV—IV. The cutting tip 13 which also may be unsymmetrically arranged has two cutting edges 24, 25 and primary phases 26, 27 connected thereto. The primary phases 26, 27 either have a constant width or taper in direction from the nose part 28. At the final cuts of the thread the chips are thin and therefore the tapered form of the primary phases 26, 27 keep the positive cutting course. A positive cutting surface 29 forms a first chipforming surface and extends inside the primary phases 26, 27 and the nose part 28, down towards a bottom 30 of the recess 22 after which the recess 22 ends at a U-formed rear edge 31. The legs of the rear edge 31 extend perpendicular to the connected primary phase 26 and 27 respectively. The rear edge 31 shall not participate in forming of the chip and therefore it must not be placed too near the nose part 28 which would lead to a negative cutting geometry. The rear edge 31 must not break the upstanding area 23 which could lead to chipbreaking at the steep wall that arises. Thus, the radially inner point of the rear edge or inner surface 31 along the line IV—IV shall be placed somewhere between half of the maximum feeding depth D (FIG. 1) and the lower edge 32 of the upstanding area 23. Stated another way, the first chipforming surface 29 extends inwardly to at least one half of the maximum feeding depth D. The maximum feeding depth D is defined as the distance beteen the outer point of the cutting tip 13 and the perpendicular juncture of a tangent to the top cutting edge 21 with the line IV—IV. An upper edge 33 of the upstanding area 23 is inclined an angle $\rho$ relative to the side wall 19 which angle is between 50° to 80°, preferably 60° to 75°. The top cutting edge 21 and a free surface 34 are arranged on each side of the cutting tip 13. The top cutting edge 21 cuts the tops of the thread at the same time as the cutting tip 13 execute the final passes in order to establish the profile of the thread. The top cutting edge 21 is placed before the cutting tip 13 in the longitudinal feeding direction in FIG. 3, but it may also be arranged on the opposite side or on both sides of the cutting tip 13. A cutting surface or intermediate surface 35 that surrounds the recess 22 transforms radially inwards relative to the rear edge 31, relatively steep into the upstanding area 23 which forms a second chipforming surface.

Figure 4:
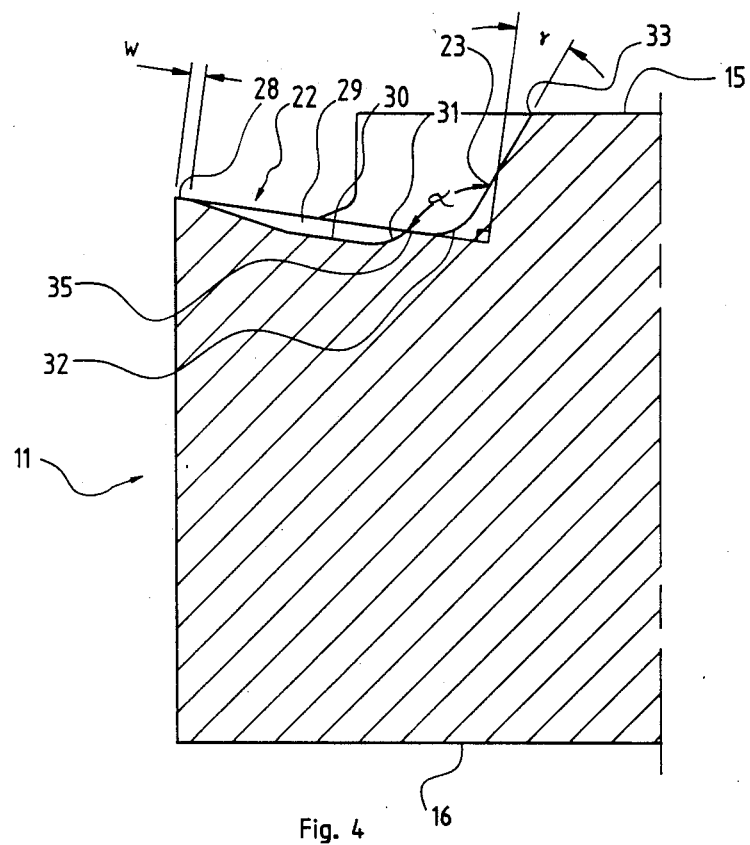
FIGS. 4 and 5 are cross sectional views of a cutting corner of the thread cutting insert of the subject invention, taken along lines IV—IV and V—V of FIG. 3; resp.

Referring now to FIG. 4, the cutting corner 11 comprises the nose part 28 having a width w, the recess 22 having a positive cutting surface 29, the bottom 30 and the rear edge 31. The cutting surface 35 is arranged between the recess 22 and the upstanding area 23. The upstanding area 23 is inclined an angle $\gamma$ relative to the normal of the cutting surface 35. The angle $\gamma$ that is dependent on the angle $\rho$, should be less than 33°, preferably between 20° to 30° in order to obtain an advantageous final shaping of the chip. Stated another way, the second chipforming surface 23 forms an obtuse angle $\alpha$ relative to the cutting surface 35, which angle $\alpha$ equals $90 + \gamma$ (FIG. 4). Since the angle $\gamma$ is to be less than 33° and preferably is to be between 20° and 30°, this means that the angle $\alpha$ should be less than 123° (i.e., 90°+33°) and preferably between 110° (i.e., 90°+20°) and 120° (i.e., 90°+30°).

Figure 5:
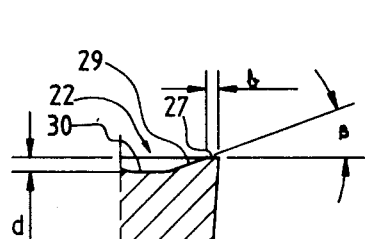

In FIG. 5 the cutting corner 11 is shown wherein it comprises the primary phase 27 having a width b which should be less than 0.3 mm, preferably 0.1 mm, the positive cutting surface 29 inclining an angle $\beta$ relative to the primary phase 27. The angle $\beta$ is between 5° to 30°, preferably 20°. The primary phases 26, 27 may be inclined from −15° to +15° relative to the cutting surface 35. The bottom 30 is shown flat in FIG. 5 but it may instead be rounded at the minimum point of the recess 22. The depth d of the recess 22 is less than 0.3 mm, preferably 0.12 mm.

Figure 6:
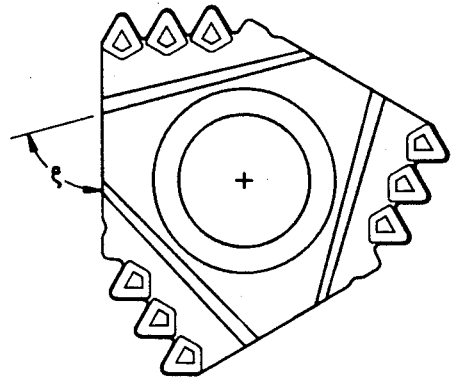
FIG. 6 is a top view of an alternative embodiment of a thread cutting insert of the subject invention.

FIG. 6 shows an alternative embodiment of a thread cutting insert of the subject invention. Each cutting corner is provided with three cutting tips and in this case the angle preferably is chosen in the upper part of the interval 50°–80°. Of course the number of cutting tips may be changed to two or four.

At chasing of threads with radial feeding with a thread cutting insert according to the present invention, the chip will be cut along the entire cutting edges 24, 25 or along parts thereof and therefore the chip will be preformed while it follows the positive cutting surface 29 and then it is finally shaped by the upstanding area 23. The upstanding area 23 controls the chip so that it obtains a small radius of curvature at the same time as the area 23 guides the chip away from the work piece and the tool. The thread cutting insert is shaped so that the recess and the upstanding area cooperate in order to obtain a good result when machining different materials and at varying machining data.

I claim:

1. A thread cutting insert comprising a flat wafer of cutting material of generally triangular form and comprising:

an upper face, and a lower face situated opposite and generally parallel to said upper face, and
   a plurality of side walls disposed between said upper and lower faces, with the juncture between a pair of said side walls defining an outwardly projecting cutting corner which is recessed downwardly with respect to said upper face, said cutting corner including
   a pair of cutting edges which converge outwardly and meet to form a nose and define a maximum feed depth for the insert, and
   an upper surface disposed inwardly of said cutting edges, said upper surface comprising
   a pair of lands disposed immediately inwardly of respective ones of said cutting edges,
   a first chipforming surface which defines a positive rake angle and extends downwardly and inwardly from said lands to a location which is disposed between said cutting edges and spaced inwardly from said nose by a distance of at least one-half of said maximum feed depth, and
   a second chipforming surface spaced inwardly of said first chipforming surface and extending upwardly to said upper face.

2. Thread cutting insert according to claim 1, wherein said first chipforming surface comprises a portion of a recess situated between said cutting edges, said recess including an inner surface extending upwardly and inwardly relative to a lower end of said first chipforming surface, said second chipforming surface disposed inwardly from an upper end of said inner surface.

3. Thread cutting surface according to claim 2, including an intermediate surface disposed between said upper end of said inner surface and a lower end of said second chipforming surface.

4. Thread cutting insert according to claim 2, wherein said recess is bordered by said nose, said lands, and said intermediate surface.

5. Thread cutting insert according to claim 2, wherein said recess extends inwardly beyond said maximum feeding depth.

6. Thread cutting insert according to claim 1, wherein said second chipforming surface is substantially flat and forms an obtuse angle relative to a plane defined by said lands.

7. Thread cutting insert according to claim 6, wherein said obtuse angle is less than 123°.

8. Thread cutting insert according to claim 7, wherein said obtuse angle lies between 110° and 120°.

9. Thread cutting insert according to claim 6, wherein the intersection of said second chipforming surface and said upper surface is defined by a line which forms an acute angle between 50° and 80° relative to one of said side walls forming said cutting corner.

10. Thread cutting insert according to claim 9, wherein said acute angle lies between 60° and 75°.

11. Thread cutting insert according to claim 1, wherein said lands each have a constant width.

12. Thread cutting insert according to claim 1, wherein said lands have a tapering width.

* * * * *